United States Patent [19]
Belokin, Jr.

[11] 4,316,551
[45] Feb. 23, 1982

[54] ALUMINUM CONTAINER

[76] Inventor: Paul Belokin, Jr., Rte. 4, Hayward, Wis. 54843

[21] Appl. No.: 123,989

[22] Filed: Feb. 25, 1980

[51] Int. Cl.³ .......................... B65D 1/40; B65D 8/04
[52] U.S. Cl. .................................... 220/1 R; 215/1 C
[58] Field of Search .................. 220/1 R, 1 BC, 6, 72; 150/0.5; 215/1 C; 222/97, 102, 215; 229/4.5, 41 R

[56] References Cited

U.S. PATENT DOCUMENTS

| | | |
|---|---|---|
| 1,617,857 | 2/1927 | Mallory . |
| 2,139,143 | 12/1938 | Wiswell .................................... 220/6 |
| 3,089,533 | 5/1963 | Stauchbery et al. . |
| 3,162,371 | 12/1964 | Palmer et al. . |
| 3,259,091 | 7/1966 | Campbell . |
| 3,353,700 | 11/1967 | Kalina ................................. 220/1 R |
| 3,401,826 | 9/1968 | Anthony . |
| 3,472,418 | 10/1969 | Ullman . |
| 3,872,994 | 3/1975 | Hyde .................................... 220/1 R |
| 3,918,603 | 11/1975 | Hatada ................................. 220/1 R |

*Primary Examiner*—George E. Lowrance
*Attorney, Agent, or Firm*—Wegner, Stellman, McCord, Wood & Dalton

[57] ABSTRACT

A seamless aluminum container of the type used for beer, soft drinks, edible goods or the like is provided which container is adapted to be manually axially collapsed in a predetermined pattern to a smaller size when its contents are exhausted, the container collapse being accomplished without the need of any apparatus for guiding the container sidewall collapse and without the aid of any mechanical or fluid pressure device. The container sidewall is embossed with a number of adjacent rows of similar, shallow, elongate embossments, adjacent embossments of a row being separated by narrow increments of the lateral surface. Rows of sharply angled rib means separate the rows of embossments. Increments in a row of embossments are each offset peripherally from increments of an adjacent row. Manual axial forces collapse adjacent rows of embossments about an interposed rib means to form a collapsed container approximately one-fifth the size of the original container. The device encourages consumers to recycle aluminum, facilitates the storage and transport of aluminum cans to a recycling station, strengthens aluminum cans in a transverse direction permitting thinner aluminum stock to be used, and conserves aluminum and the energy needed to produce aluminum.

19 Claims, 14 Drawing Figures

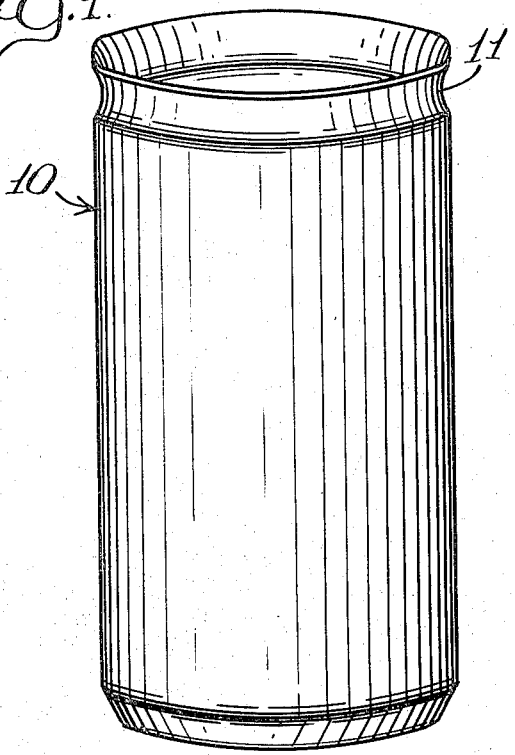
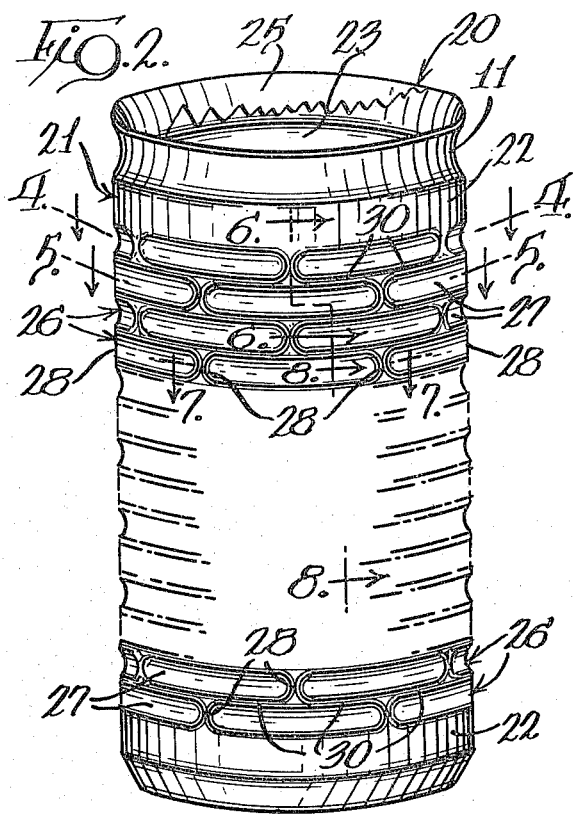
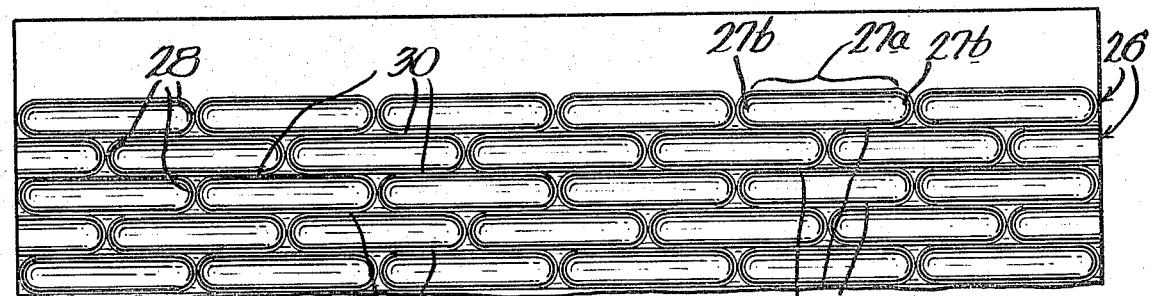
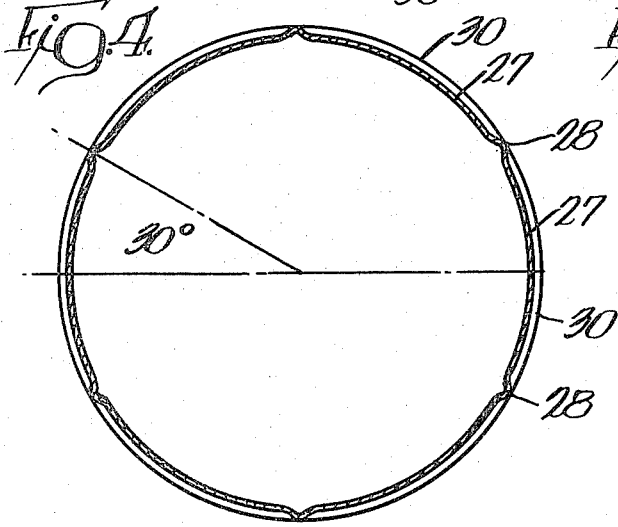
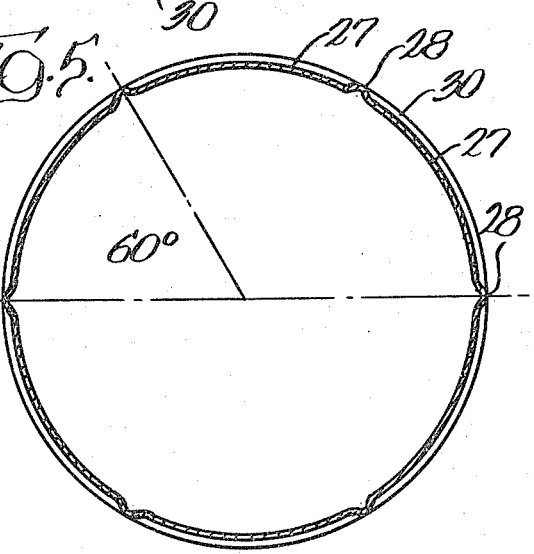

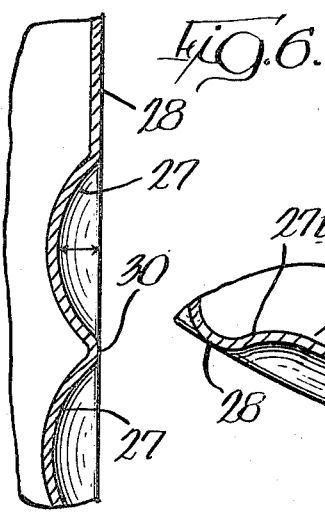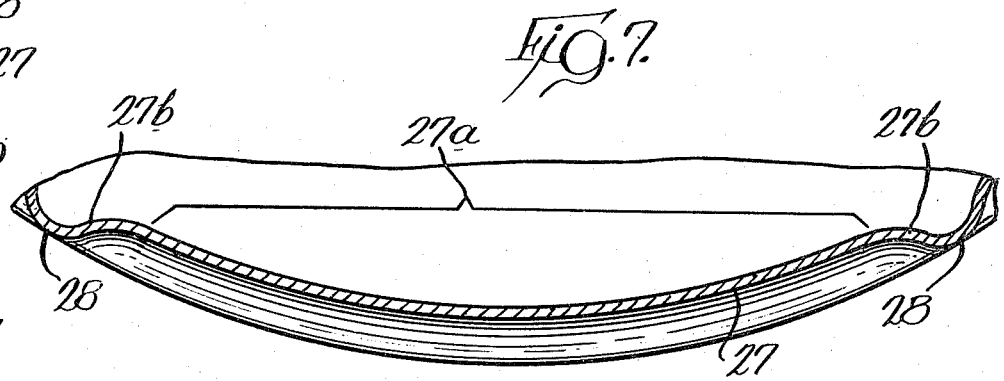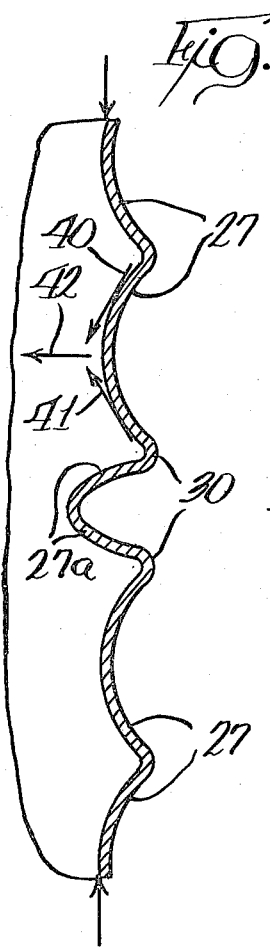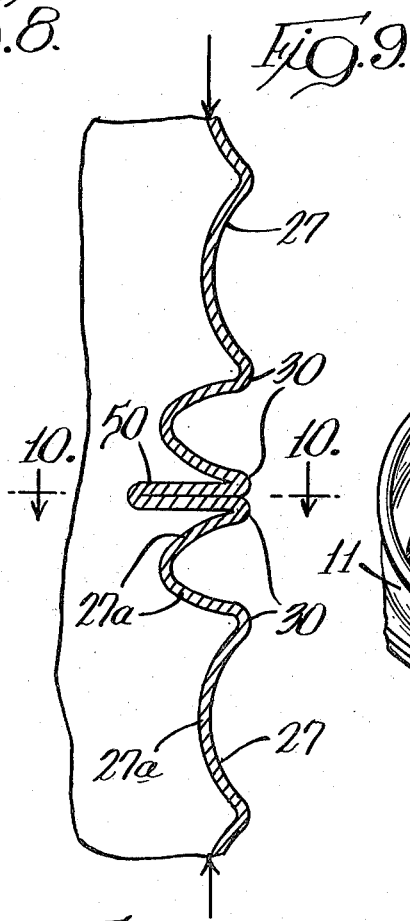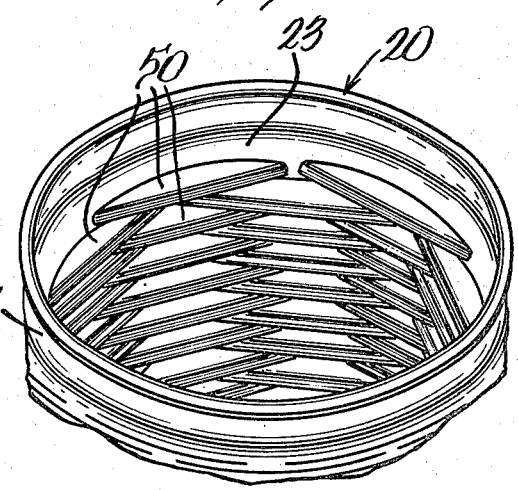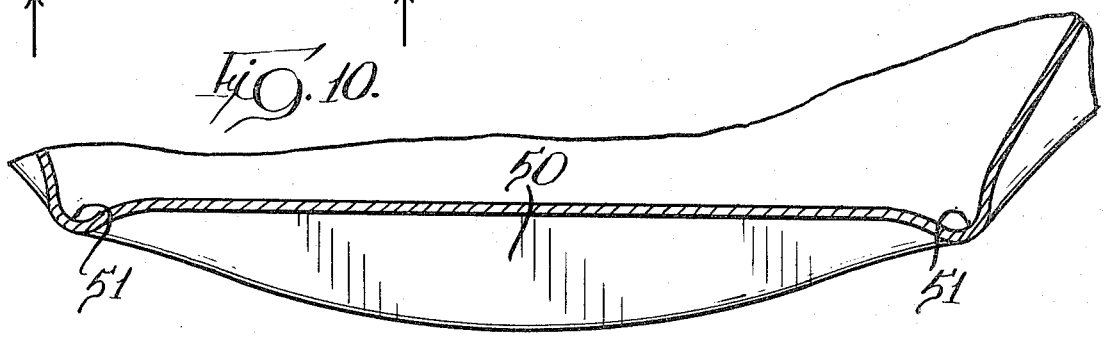

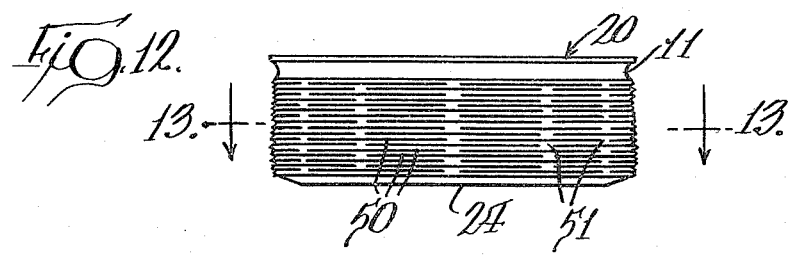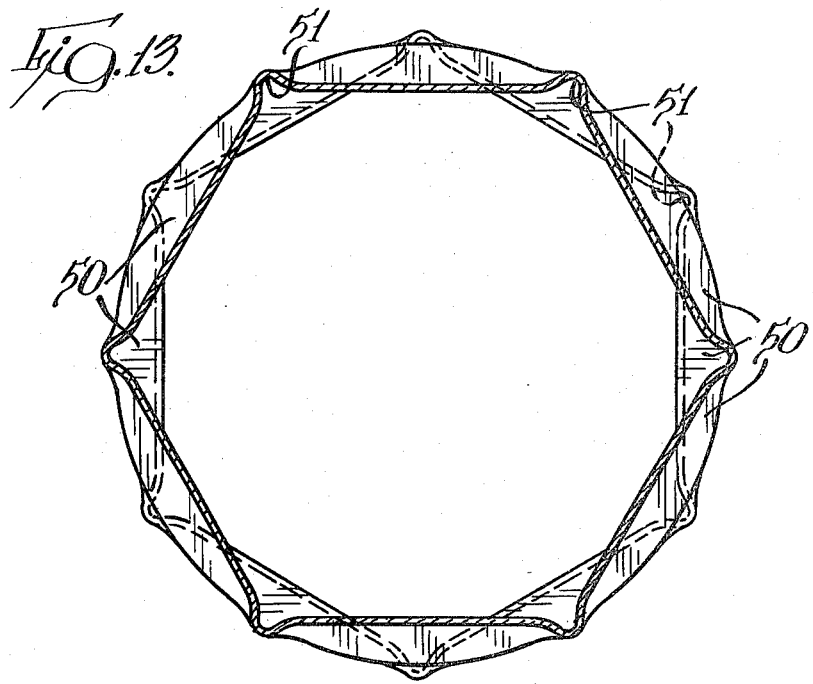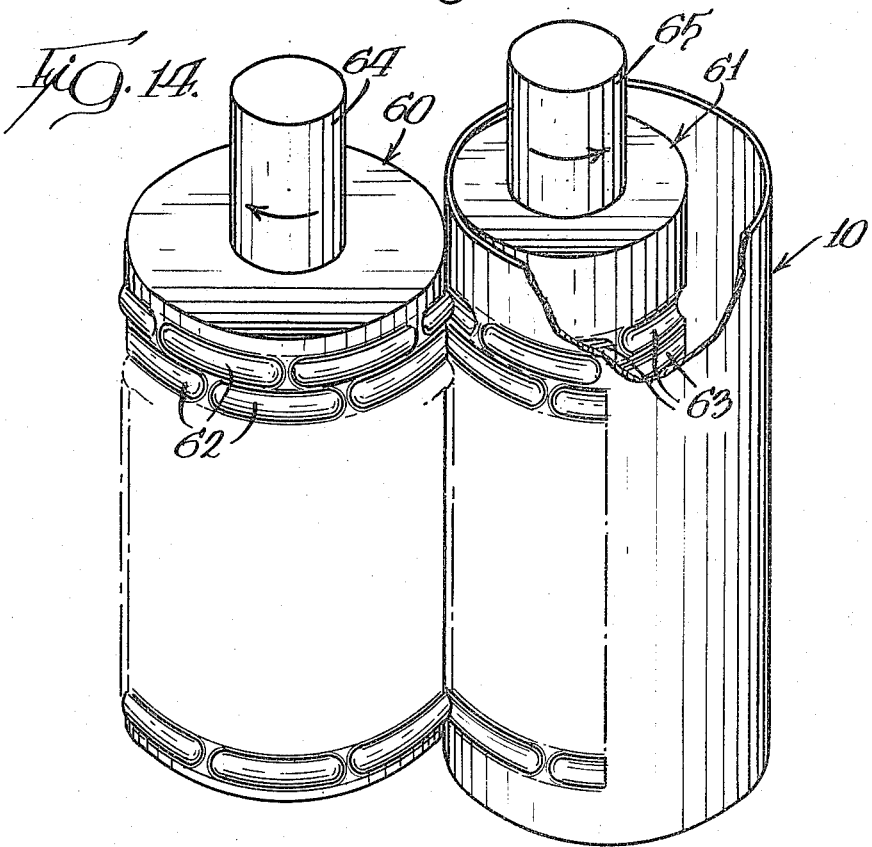

ALUMINUM CONTAINER

BACKGROUND OF THE INVENTION

1. Field of the Invention

This invention relates to a collapsible seamless aluminum container of the type used for beer, soft drinks, or the like, and more particularly to such a container which can be manually axially collapsed in a predetermined pattern to a smaller size when its contents are exhausted.

2. Description of the Prior Art

Metal containers of the prior art have been provided with ribs in the container lateral surface extending both horizontally and longitudinally. However, such ribs have been positioned, constructed and arranged to effect a strengthening function in the lateral surface or sidewall of the metal container. Similarly, metal container sidewalls have also been provided with embossments of varying shapes, but these deformations are generally again for the purpose of increasing the strength of the container sidewall. Applicant is not aware of any prior seamless aluminum can or container for accommodating beverages or other goods which is formed of sufficient strength for its intended purpose, and yet can be axially collapsed by manual pressure when exhausted of its contents so that the container will occupy a minimum of space.

In the patent prior art, U.S. Pat. No. 3,401,826 shows a packaging system in which vertical corrugations, horizontal corrugations and diamond-shaped embossing is used to strengthen the sidewalls of a package or container to be formed. The patent discloses light-gauge material which is initially formed in the shape of a flattened tube for shipping purposes, and then containers formed from the tube are expanded, provided with a bottom closure member, filled with the desired contents, and provided with an appropriate cover or lid. No structure is provided in the sidewalls to facilitate axial collapsibility of the container after the contents of the container are removed; in fact, the deformations in the sidewall of the container are stated to be for strengthening the sidewalls.

U.S. Pat. No. 3,472,418 shows annular corrugations in the sidewall of a large drum, which corrugations again are for strengthening the sidewalls.

U.S. Pat. No. 3,089,533 relates primarily to an apparatus for beading thin metal cylinders by passing a ribbed mandrel over the lateral surface of the cylindrical body. Both horizontal and vertical ribs are shown in the lateral surface of the container and the purpose of the ribs is to strengthen the lateral surface of the cylindrical body. The lateral surface is not intended to be axially collapsible.

Prior art U.S. Pat. No. 2,139,143 discloses expressor mechanisms or collapsing devices for dispensing liquids and semi-liquids from sealed containers by applying mechanical screw pressure or pneumatic pressure endwise of the sealed containers to squeeze the container into a collapsed condition so as to empty the contents of the container. In two of the devices which apply rotative screw pressure, the opposite ends of the container being collapsed are rotated relative to each other so that the container walls are collapsed in a spiral fashion. The pneumatic pressure device has a cylinder within which a piston reciprocates to squeeze a container in the cylinder against a stationary head. The container disclosed by the patent is provided with spaced creases which extend intermittently and diagonally or spirally around the lateral surface of the container. Intermittent horizontal creases spaced axially of the container are also diagrammatically shown.

SUMMARY OF INVENTION

Billions of aluminum cans or containers are manufactured and used in the United States each year, and their use is increasing for beverages and other goods for human consumption. Particularly with beverages, cans made from aluminum provide greater palatability than other metal containers.

The common practice is simply to throw the cans away after use which is wasteful of valuable aluminum materials. A large portion of our aluminum ore (bauxite) is imported which adversely affects our foreign monetary balance of payments. More importantly, the conversion of aluminum ore to aluminum metal requires large amounts of electrical energy, the industry being extremely energy oriented and energy intensive. Aluminum metal which is saved, recycled and reused thus conserves both valuable materials and increasingly valuable supplies of energy. Therefore, consumers purchasing goods in aluminum cans must be encouraged to save the cans, to store the cans, and to transport the cans to a central collection agency, which in turn will store and have the cans transported to a recycling center.

One of the principal deterrents in establishing an effective recycling operation is the inconvenience of storing and transporting the space-consuming cans in their cylindrical condition. Space is consumed within the chambers of the cans and between adjacent cans, again both in storage and in transport.

The present invention enables a consumer to manually axially collapse an aluminum can to about one-fifth its normal size, substantially obviating the deterent referred to above. Conservationists advocating aluminum recycling are also advocating some small payment for each can returned for recycling. The present invention will give added impetus to this needed conservation measure by encouraging the consumer to participate in the recycling operation and by facilitating the handling of the cans by all persons involved in the recycling operation.

It is the principal object of the present invention to provide a seamless aluminum container for beverages, edible goods, or the like, which is adapted to be axially collapsed by manual pressure in a predetermined pattern without using any guiding surfaces adjacent the peripheral sidewalls of the container.

Another object of the invention is to provide a readily collapsible can or container which can be collapsed by applying manual pressure from the foot of an individual with the can resting on a supporting surface.

A further object of the invention is to encourage the conservation of aluminum, and its concomitant energy processing requirements, by facilitating aluminum recycling.

A further object of the invention is to provide a collapsible can for beverages or the like having alternate annular rows of embossments and ribs formed in the lateral surface thereof to strengthen the sidewall of the can in a direction transverse of the axis of the can whereby the can can be formed with a thinner aluminum sidewall.

Still another object of the invention is to provide embossments in the lateral surface of the collapsible can to facilitate the grasping of the can by the hand of an individual utilizing the contents of the can, and to increase the available sidewall surface area for cooling purposes.

It is estimated that about one aluminum can in four or five is now being returned for a recycling operation, even though many manufacturers of products utilizing aluminum cans encourage the consumer by stating on each can "All aluminum Please recycle". It is an important purpose of the present invention to provide an easily and readily collapsible aluminum can which will encourage the recycling of aluminum cans by economizing on storage and transporting space required from the consumer to the aluminum recycling station.

In an exemplary embodiment of the invention, a seamless aluminum container is provided which is adapted to be axially collapsed in a predetermined pattern after the contents of the container have been removed. The container has a seamless sidewall of thin bendable metal which provides an outer lateral surface shaped generally in the form of a right circular cylinder. The container is closed at the bottom and is provided with a top closure member which may be provided with a manually removable tab as currently in common use on beverage cans or with some similar access means to the inner chamber of the can. A plurality of circumferential adjacent rows of similarly shaped embossments are impressed into the lateral surface of the can which embossments afford with the lateral surface of the can an outwardly directed circumferential rib between adjacent embossment rows. The embossments of each row are elongated and each embossment in a row is spaced from adjacent embossments of that row to afford an increment of the lateral surface sidewall between adjacent embossments.

Each row of embossments is also angularly offset in a circumferential direction from an adjacent row of embossments. This angular offset positions the increment of the lateral surface in axial alignment with the midportion of the embossment of an adjacent row.

When an empty can is placed uprightly on a supporting surface, axial pressure on the can by the foot of an individual will collapse the sidewall in a predetermined pattern. The sidewall folds circumferentially at each annular rib and the resultant of forces on each embossment bends each embossment in a row inwardly to form in each embossment row an annular series of chord-like plates or segments. Each segment of a series extends between adjacent increments of the lateral surface in an embossment row; and the segments of each embossment row are each angularly offset in a circumferential direction from the segment formed in an adjacent embossment row.

BRIEF DESCRIPTION OF THE DRAWINGS

The details of construction and operation of the invention are more fully described with reference to the accompanying drawings which form a part hereof and in which like reference numerals refer to like parts throughout.

In the drawings:

FIG. 1 is an upright perspective view of a seamless aluminum can, with the top removed, exemplifying the type of prior art can currently available in the marketplace;

FIG. 2 is an upright perspective view of a seamless aluminum can, with the top closure member broken away, showing embossments in the lateral surface of the sidewall of the can, it being understood that the rows of embossments extend annularly about the can and in like manner in the space between the upper and lower rows of embossments shown;

FIG. 3 is a developed view, for illustrative purposes only, showing a portion of the embossed sidewall of the container as the sidewall would appear in plan view if vertically cut and placed in a planar position;

FIG. 4 is a sectional view taken as indicated on line 4—4 of FIG. 2;

FIG. 5 is a sectional view taken as indicated on line 5—5 of FIG. 2;

FIG. 6 is an enlarged sectional view taken as indicated on line 6—6 of FIG. 2;

FIG. 7 is an enlarged sectional view taken as indicated on line 7—7 of FIG. 2;

FIG. 8 is a sectional view taken as indicated on line 8—8 of FIG. 2 and illustrating the initial folding action of an embossment between adjacent annular ribs, the embossment beginning to be deformed inwardly by the forces at opposite ends of the sidewall, as indicated by the opposing arrows;

FIG. 9 is a view similar to FIG. 8 and showing continued application of opposing forces, as indicated by the arrows, to form a chord-like plate or segment in one embossment of a row of embossments;

FIG. 10 is a sectional view taken as indicated on line 10—10 of FIG. 9 and showing the general shape of the bottom portion of a chord-like plate or segment in fully folded position;

FIG. 11 is a fragmentary perspective view of the inside of the container of FIG. 2 showing the general configuration of the chord-like plates or segments being formed when the can of FIG. 2 is collapsed to one-half the height shown in FIG. 2;

FIG. 12 is a side elevational view of the can in FIG. 2 in fully collapsed position, the height being about one-fifth the height of the can in FIG. 2;

FIG. 13 is an enlarged sectional view taken as indicated on line 13—13 of FIG. 12 to illustrate two series of adjacent chord-like plates and the annular offset between them; and FIG. 14 is a diagrammatic showing of a pair of cooperating dies, each in mandrel form, for forming the rows of embossments in the lateral surface of a seamless aluminum can.

DESCRIPTION OF THE PREFERRED EMBODIMENT

Conservation of energy and conservation of raw materials are increasingly important objectives in today's economy. Current television advertisements emphasize the need for recycling aluminum cans and show prior art cans as in FIG. 1, generally designated 10, being carried by the truckload toward a recycling station.

The collapsible can of the present invention will utilize and require less than one-fifth the space of the can of FIG. 1. The collapsible container is constructed and arranged to easily be placed in collapsed condition, as in FIG. 12, by a consumer after the contents are extracted from the container. Manual foot pressure of a consumer applied axially of the can of FIG. 2 will collapse the peripheral sidewalls in a predetermined pattern, as shown in FIGS. 11, 12 and 13, without the need of any apparatus for guiding the sidewall collapse and without the aid of a mechanical or fluid pressure device.

Can 10 is generally formed by an extrusion process from aluminum, a popular size having a height of about 4.75 inches and a diameter of about 2.50 inches. The annular sidewall is generally formed to a thickness of 0.0050 inches to 0.0065 inches. In extruding, the sidewall and the bottom closure member are integrally formed. In FIG. 14, the can 10 of FIG. 1 (absent the neck portion 11) is shown being formed into the structure of FIG. 2.

Referring to FIG. 2, a seamless aluminum container, generally designated 20, is provided with a peripheral sidewall 21 formed in seamless fashion of thin sheet aluminum. The endless peripheral sidewall 21 affords an outer lateral surface 22 which is preferably generally shaped in the form of a right circular cylinder forming an inner chamber 23, the chamber enclosed by a bottom closure member 24 and a top closure member 25. The top closure member is secured to the upper part of the endless sidewall in a conventional manner and the top closure member may be provided with a removable tab or other access means, not shown, to provide access to the inner chamber 23 and to the contents of the container. While the container 20 shown herein is in the shape of a right circular cylinder, it is understood that other forms of cylinder of annular cross section may be used within the scope of the present invention.

Means are provided in the lateral surface 22 for stiffening said surface against pressures transverse to the axis of the container 20, while at the same time affording a sidewall 21 which is readily collapsible under manual axial pressure when the contents of the can is exhausted. The stiffening means enables the use of thinner aluminum material, e.g. 0.0040 inches, thus effecting a savings in valuable material. Generally, the contents filling the container 20 supplements the integrity of the sidewall 21 during storage and prior to use by the consumer. To this end, and as best shown in FIGS. 2 and 3, the lateral surface of the sidewall is provided with a plurality of circumferential or peripherally extending rows 26 of inwardly directed embossments 27. Each embossment 27 is similarly shaped and is elongated in a direction extending circumferentially of the container. The embossments 27 of each row are spaced from each other about the periphery of the container 20 to provide an increment 28 whose locus lies in the lateral surface 22 of the sidewall 21 between adjacent embossments 27 of each row 26.

As best seen in FIGS. 6 and 7, each embossment is formed to afford a major portion 27a each of which is provided at opposite ends with an end minor portion 27b. Each major portion extends arcuately inwardly of the lateral surface 22 and in cross section (FIG. 6) preferably is formed in the shape of an arc of a circle with the largest depth being approximately 0.060 inches, the circle radius being approximately 0.150 inches. In peripheral cross section, each major portion 27a is preferably arcuate and, as shown in FIG. 7, is in the shape of an arc of a circle having a common center with the radius of the lateral surface of the can 20. Each end minor portion 27b is gently curved outwardly to blend with and join the adjacent increments 28 of an embossment row, as shown in FIG. 7.

Thus, the major portion 27a of each embossment 27 preferably extends at a uniform depth into the lateral surface between end minor portions 27b, and the deepest portion of each embossment extends preferably on the arc of a circle of lesser radius than the radius of the lateral surface of the can.

Each row of embossments 27 preferably extends about the lateral surface 22 in a plane perpendicular to the axis of the can 20. Adjacent rows are formed closely together, as indicated in FIGS. 2 and 3, to provide annular rib means 30 therebetween which contribute to the stiffening of the sidewall 21 of the can 20 against forces directed transversely of the axis of the can. The rib means 30 extend peripherally of the container 20 between adjacent rows of embossments. Preferably adjacent rib means are spaced approximately 0.250 inches when the diameter of can 20 is approximately 2.50 inches. Preferably also, in such can dimensions, six embossments are provided in each row to afford a hexagonal folding action as shown in FIG. 13. The number of embossments in each row and the spacing between adjacent rib means 30 may be increased or decreased to accommodate cans of varying diameters. Likewise, the depth of each embossment and its shape in longitudinal section and in cross section may be varied as long as the folding action by axial pressure is accomplished as shown in FIGS. 8 and 9. An acceptable folding action is attained with a 2.50 inch diameter can when the rib means are spaced vertically a distance ranging from 3/16 inches to ⅜ inches with the embossments of the contour as pointed out herein.

Referring to FIGS. 2, 4 and 5, each row 26 of embossments is angularly offset in a peripheral or circumferential direction from an adjacent row of embossments. As indicated in FIG. 4 and in FIG. 5, the rows of embossments are preferably angularly offset in a circumferential direction approximately 30°. By angularly offsetting adjacent rows of embossments, the lateral surface increments 28 may be placed in axial alignment with the center portion of the major embossment portion of alternate rows of embossments. The positioning of the increments 28 of the lateral surface 22 is important in predetermining the pattern of collapse of the container.

When collapsing a can, it is preferred that the can be placed upon a surface which will allow the air pressure within the can to readily escape when axial pressure, e.g., from an individual's foot, is applied. Also, during initial collapse, the row of embossments near the center of the can will generally be the first row to show a folding or collapsing action, which is to be expected since reactive pressure from the supporting surface as well as pressure upon the exposed end of the can is being applied to the container sidewall.

The initial folding action of the major portion 27a of each embossment in a row results from the application of opposing forces through the increments 28 in the rows above and below each major portion being folded or collapsed. Vector forces from the increments 28 in adjacent rows are applied to the major portions 27a of the embossments of a row being collapsed in the direction of the arrows 40, 41 in FIG. 8 to provide a resultant force directed inwardly of the can 20 in the direction of arrow 42.

Actually in FIG. 8, an initial row of one of the rows of embossments is shown partially folded from the application of the vector forces referred to above. Since the embossments are concave in cross section and arcuate in longitudinal section, adjacent embossments in a row during folding tend to exert opposed forces upon each interposed increment 28 of that row urging each increment in a direction outwardly of the lateral surface 22. In other words, each arcuately convex, longitudinal section, during folding, tends to move inwardly of the can 20 from the position shown in FIG. 7 to the chordal position shown in FIG. 10 which movement exerts forces endwise of the embossment upon adjacent increments 28 of the row being folded. This action and these forces destroy the structural integrity of each increment in a row and assist in collapsing the increments 28 of the row. As the folding or bending action continues toward the position shown in FIG. 9, the embossment walls of each major portion 27a and minor portion 27b of a row are gradually folded to form a series of similar chord-like plates or segments 50.

The embossments 27 of each row and the increments 28 between adjacent embossments of a row predetermine the pattern of fold of the row because the embossments 27 are less resistant to axial folding pressure than are the increments 28. In other words, axial force applied to increments 28 centrally of the embossments 27 initiate the folding of the embossments in a row. Thus with six embossments in the initially collapsing row, the collapsed embossments or segments 50 tend to form a hexagonal type structure with the apex 51 of each of the interior angles of the hexagon being located substantially at the increments 28, as shown in FIG. 13. Since the increments 28 of each row of embossments are offset peripherally from the increments of an adjacent row, the collapsed increments of adjacent rows are offset from each other as shown in FIG. 12 and FIG. 13. FIG. 12 and FIG. 13 show twelve axially extending rows of collapsed increments 28. Clearly, the increments of each row of embossments can be varied in their peripheral offset so that the positions of the collapsed increments can be made to vary from the positions shown in FIG. 12 and FIG. 13.

Generally, before the initial row of embossments is folded, adjacent rows above and below the initial row commence their folding action in the manner described above, each embossment of said rows folding inwardly about the annular, outwardly directed, sharply-angled rib means, as shown in FIG. 9. Each rib means, though extending intermittently about the can because of increments 28, serves as sort of an annular line of weakening about which embossments of adjacent rows are folded under axial pressure.

After the annular series of chord-like plates or segments 50 of the initial collapsing row of embossments is formed (FIG. 9), the upper and the lower rows of embossments are sequentially collapsed or folded starting with the upper and lower row immediately adjacent the initial collapsed segments 50. The collapsing action is increasingly facilitated with each row that is collapsed because an increasingly stable annular depth of plates or segments is built up against which the opposed axial forces in the sidewall can bear or act.

Referring to FIG. 14, a diagrammatic illustration is shown for forming the sidewall 21 of the can 20 of the present invention. A pair of cooperating embossing dies 60, 61, each in mandrel form, may be provided for gripping and forming the lateral surface 21 of the can therebetween. Die 60 is the male die, and is shown with rows of spaced peripheral projections 62, the exposed surface of each projection being shaped to form an embossment 27. As shown here, die 60 has six projections in each annular row so that one rotation of the die will completely form the rows of embossments in the lateral surface of the can.

Die 61 is the female die and has a number of rows of cavities 63 in its annular surface, each cavity being shaped to closely receive a projection of die 60 as the dies are turned in timed relation by rotatable shafts 64 and 65. Die 61 is provided with three cavities in each annular row of cavities, and thus die 61 rotates twice to complete the embossing of the lateral surface of the can. Die 61 is made smaller than the diameter of the can to permit its retraction from the lateral surface of the can upon completion of an embossing operation.

The embossing dies 60, 61 are shaped to provide a shallow and gradual drawing operation on the thin aluminum material to form embossments 27 which have no appreciable change in material thickness whereby fracturing problems caused by plastic flow of aluminum are avoided.

It is contemplated within the scope of the present invention that the embossments 27 shown herein may be impressed outwardly of the sidewall 21 of can 20 so that each of the annular rib means 30 is directed inwardly of the container. In other words, the positions of the embossments and rib means are reversed. In such an arrangement, the longitudinal section of each embossment would appear as the mirror image of the embossment of FIG. 7, while each increment 28 would be positioned as heretofore disclosed. Since each longitudinal section of an embossment 27 in a row would be arcuately concave outwardly from the lateral surface of the sidewall 21, axial forces through the increments 28 above and below an embossment would fold the major and minor portions of the embossment outwardly to form a plate or segment with an arcuate free end, rather than a chord-like free end as heretofore described. However, in this case, the structural integrity of adjacent increments 28 is impaired principally by the folding of the minor end portions to cause collapse of the increments 28, rather than the folding action heretofore described in respect to FIG. 7 through FIG. 10.

I claim:

1. A metal container adapted to be axially collapsed in a predetermined pattern when exhausted of its contents, comprising: an endless peripheral sidewall of thin metal material affording a lateral surface of right circular cylindrical shape and having open opposite end portions each provided with a closure member to afford an inner chamber for the contents of the container, access to the chamber being provided through one of the closure members, the lateral surface of said sidewall being provided with a plurality of peripheral adjacent rows of inwardly directed, similarly shaped embossments affording between adjacent rows an outwardly directed peripherally extending rib means providing an annular line of fold between adjacent rows, each embossment of each row being spaced from adjacent embossments of each row to afford a narrow arcuate increment of the lateral surface of the sidewall therebetween, and each embossment being elongate peripherally to provide a major portion of arcuate cross section and outwardly curved end minor portions each joining an adjacent increment of the lateral surface, each row of said embossments being positioned substantially perpendicular to the axis of the container and each being angularly offset in a peripheral direction from an adjacent row of embossments to position each lateral surface increment of a row in axial alignment with a major embossment portion in an adjacent row, whereby manual axial pressure on the container through said peripheral sidewall will collapse said sidewall in a predetermined pattern by bending peripherally on each rib means and by folding inwardly the major and minor portions of each embossment of each row to form in each row an annular series of folded segments, each segment extending between adjacent increments of the lateral surface in a row, and the segments of each row being angularly offset in a peripheral direction with respect to the segments formed in an adjacent row.

2. The container as specified in claim 1 in which the major portion of each embossment in peripheral cross section is arcuate.

3. The container as specified in claim 2 in which the major portion of each embossment in peripheral cross section is arcuately convex in an outward direction.

4. The container as specified in claim 2 in which the diameter of the chamber is approximately 2.5 inches, and the vertical distance between adjacent rib means is between 3/16 and ⅜ inch.

5. The container as specified in claim 2 in which the diameter of the chamber is approximately 2.5 inches, and the vertical distance between adjacent rib means is approximately ¼ inch.

6. The container as specified in claim 2 in which the depth of each embossment in each major portion is approximately sixty-thousandths (0.060) inch.

7. The container as specified in claim 2 in which each increment of the lateral surface of a row is positioned in axial alignment with the middle of each major portion of an adjacent row.

8. The container as specified in claim 2 in which the bending of each major portion of an embossment is initiated by axial force applied through an adjacent increment of an adjacent row of embossments.

9. The container as specified in claims 2 or 3 in which the arcuate cross section of the major portion of each embossment is in the shape of an arc of a circle.

10. The container as specified in claim 2 in which each row has six embossments.

11. The container as specified in claim 2 in which the vertical distance between adjacent rib means is approximately one-quarter inch and six embossments are provided in each row.

12. The container as specified in claim 2 in which the vertical distance between adjacent rib means is approximately one-quarter inch, the depth of each embossment in each major portion is approximately sixty-thousandths inch, and six embossments are provided in each row.

13. The container as specified in claim 11 in which the diameter of the chamber of the container is approximately 2.5 inches.

14. The container as specified in claim 11 in which each increment of the lateral surface of a row is positioned in axial alignment with the middle of each major portion of an adjacent row.

15. The container as specified in claims 2 or 3 in which the axial cross section of the major portion of each embossment is arcuate.

16. The container as specified in claim 15 in which the ratio of the diameter of the chamber to the vertical distance between adjacent rib means is approximately in the range between 9:1 and 12:1.

17. The container as specified in claim 10 in which the axial cross section of the major portion of each embossment is in the shape of an arc of a circle.

18. The container as specified in claim 2 in which each folded segment formed from a collapsed embossment includes an upper layer and a lower layer of aluminum material.

19. A seamless aluminum container adapted to be axially collapsed in a predetermined pattern when exhausted of its contents, comprising: an endless peripheral sidewall of thin aluminum material affording a lateral surface of right circular cylindrical shape and having open opposite end portions each provided with a closure member to afford an inner chamber for the contents of the container, access to the chamber being provided through one of the closure members, the lateral surface of said sidewall being provided with a plurality of peripheral adjacent rows of inwardly directed, similarly shaped embossments affording between adjacent rows an outwardly directed peripherally extending rib means providing an annular line of fold between adjacent rows, each embossment of each row being spaced from adjacent embossments of each row to afford a narrow arcuate increment of the lateral surface of the sidewall therebetween, and each embossment being elongate peripherally to provide a major portion of arcuate cross section and outwardly curved end minor portions each joining an adjacent increment of the lateral surface, each row of said embossments being positioned substantially perpendicular to the axis of the container and each being angularly offset in a peripheral direction from an adjacent row of embossments to position each lateral surface increment of a row in axial alignment with a major embossment portion in an adjacent row, whereby manual axial pressure on the container through said peripheral sidewall will collapse said sidewall in a predetermined pattern by bending peripherally on each rib means and by folding inwardly the major and minor portions of each embossment of each row to form in each row an annular series of folded segments, each segment extending between adjacent increments of the lateral surface in a row, and the segments of each row being angularly offset in a peripheral direction with respect to the segments formed in an adjacent row.

* * * * *

UNITED STATES PATENT AND TRADEMARK OFFICE
CERTIFICATE OF CORRECTION

PATENT NO. : 4,316,551
DATED : February 23, 1982
INVENTOR(S) : Paul Belokin Jr.

It is certified that error appears in the above-identified patent and that said Letters Patent are hereby corrected as shown below:

Column 9, line 5, claim 2 should be renumbered as claim 3;
          same line, "1" should be --2--
    line 8, claim 3 should be renumbered as claim 4;
    line 11, claim 4 should be renumbered as claim 5;
    line 15, claim 5 should be renumbered as claim 6;
    line 19, claim 6 should be renumbered as claim 7;
    line 22, claim 7 should be renumbered as claim 8;
    line 26, claim 8 should be renumbered as claim 9;
    line 30, claim 9 should be renumbered as claim 10;
    line 33, claim 10 should be renumbered as claim 11;
          same line, "claim 2" should be -- claims 2 or 4 --
    line 35, claim 11 should be renumbered as claim 12;
          same line, "claim 2" should be -- claims 2 or 4 --
    line 39, claim 12 should be renumbered as claim 13;
          same line, "claim 2" should be -- claims 2 or 4 --
    line 45, claim 13 should be renumbered as claim 14;
          same line, "11" should be --12--
    line 48, claim 14 should be renumbered as claim 15;
          same line, "11" should be --12--

UNITED STATES PATENT AND TRADEMARK OFFICE
CERTIFICATE OF CORRECTION

PATENT NO. : 4,316,551
DATED : February 23, 1982     Page 2 of 2
INVENTOR(S) : Paul Belokin Jr.

It is certified that error appears in the above-identified patent and that said Letters Patent are hereby corrected as shown below:

Column 10, line 1, claim 15 should be renumbered as claim 16;
          line 4, claim 16 should be renumbered as claim 17;
              same line, "15" should be -- 16 --
          line 8, claim 17 should be renumbered as claim 18;
          line 11, claim 18 should be renumbered as claim 19;
          line 15, claim 19 should be renumbered as claim 2.

Signed and Sealed this

Fifth Day of April 1983

[SEAL]

Attest:

GERALD J. MOSSINGHOFF

Attesting Officer     Commissioner of Patents and Trademarks